Jan. 25, 1927.

G. M. EATON 1,615,800

METHOD OF AND APPARATUS FOR MAKING INSULATORS

Filed Aug. 6, 1923

WITNESSES:

INVENTOR
George M. Eaton.
BY
ATTORNEY

Patented Jan. 25, 1927.

1,615,800

UNITED STATES PATENT OFFICE.

GEORGE M. EATON, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF AND APPARATUS FOR MAKING INSULATORS.

Application filed August 6, 1923. Serial No. 655,913.

My invention relates to a process of, and apparatus for, working clay bodies in their plastic state, more especially to an apparatus for forming such bodies.

It is among the objects of my invention to provide a machine for working plastic bodies which shall be adapted to work the material thoroughly and uniformly throughout to produce a homogenous structure free from fissures, folds, cavities or the like.

It is a further object of my invention to provide a device of the above designated character which shall be of simple, compact and durable construction, which shall be efficient in operation in forming plastic bodies and which shall be adapted to manufacture in production quantities with uniform results.

Various devices have been utilized for forming and treating plastic bodies, such as of clay, and shaping them into various structures such as insulators, vessels or the like. Such devices generally included means for spinning the plastic material while it was being formed into shape or for centrifugally drying the bodies or for various other purposes, such as kneading or working the materials.

My present invention is directed to a device adapted to work the material as by kneading and to simultaneously form it to the desired shape. I propose a device comprising an actuating member, such as a motor, having associated therewith a suitable work table which is adapted to carry a mold containing the plastic material and having a kneading member comprising a floating matrix of suitable surface contour which is adapted to be suspended in the plastic material to work the same and form it to shape by its inertia which is variable and controllable by the acceleration and vibration of the work table.

Figure 1:
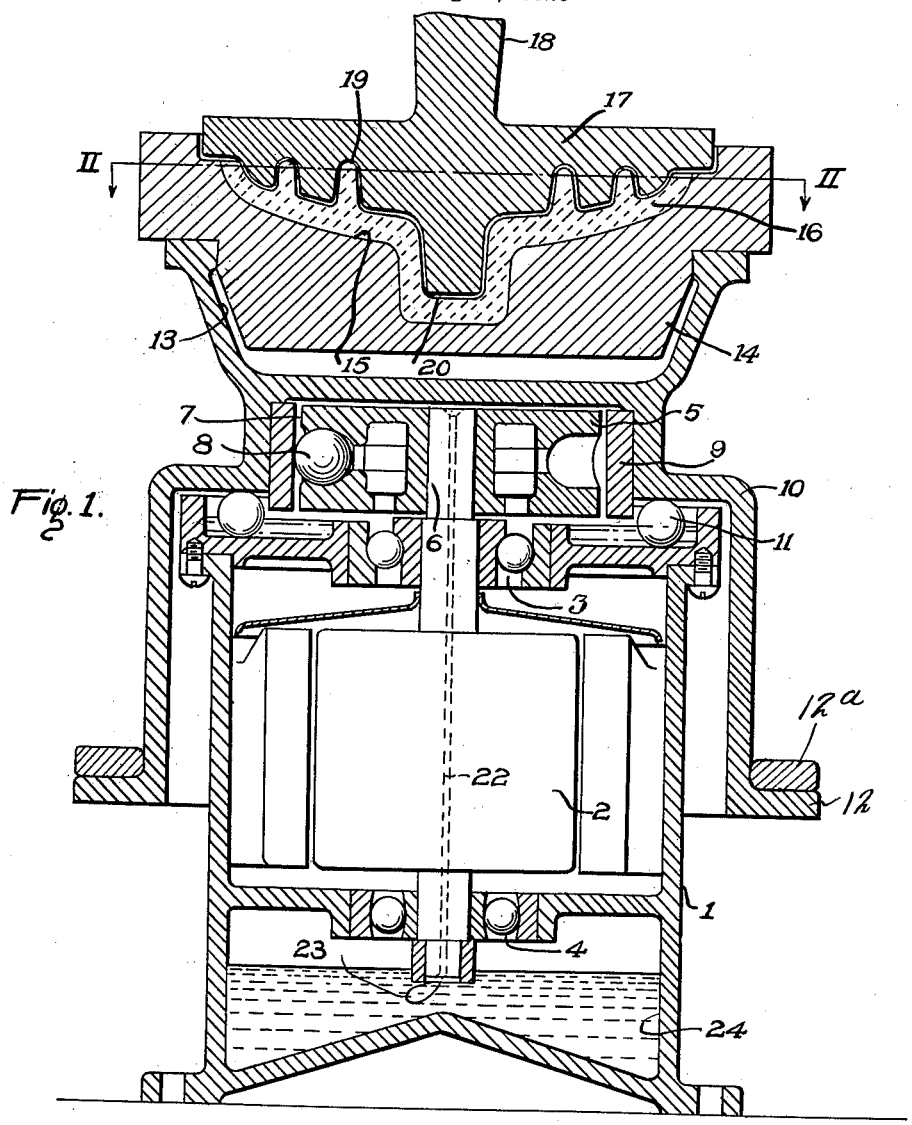
Figure 2:
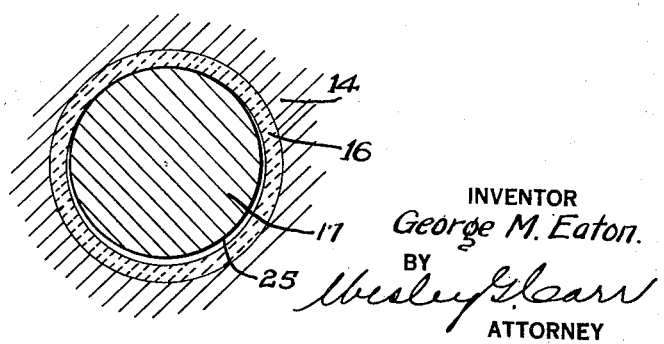

In the accompanying drawing constituting a part hereof and in which like reference characters designate like parts, Fig. 1 is a vertical cross-sectional view of a device embodying the principles of my invention, and Fig. 2 is a fragmentary, cross-sectional view thereof taken along the line II—II of Fig. 1.

Referring to Fig. 1, the device comprises a motor frame 1 having a vertically disposed armature 2 journaled therein by a plurality of anti-friction bearings 3 and 4 adapted to carry the vertical thrust. A cage 5 is secured to the end of the armature shaft 6 and is provided with one or more recesses 7 adapted to carry a ball 8 which engages a ball race 9 secured to a work table 10 which rests upon the balls 11 disposed in the upper end portion of the motor frame 1. The work table 10 is provided with an annular flange 12 adapted to receive a plurality of tapered damping rings 12ᴬ, one of which is shown mounted thereon. The purpose of these rings is to provide means for adjusting the amount and distribution of the mass of work table 10, thereby altering the amplitude or character of the vibration thereof. The upper recessed portion 13 is adapted to receive a mold 14, preferably of absorbent material, such as plaster of Paris.

The mold 14 is recessed and is provided with a surface 15 of the shape desired in the article to be formed. The mold 14 is adapted to be filled with a plastic material 16 such as clay or slip, such as is commonly employed in the manufacture of insulators, earthenware or the like and kneading member 17 having an extending handle 18 is disposed within the plastic substance 16. The member 17 is provided with recessed portions 19 and a central projecting portion 20 corresponding to the shape of the article that it is desired to form and the weight of the member 17 is such as to provide a working force which is set up by its inertia, which force is suitable for the proper working of the plastic substance 16.

The armature shaft 6 is provided with a central opening 22 which communicates with an oil scoop 23 below the oil level of the oil chamber 24 in the bottom of the motor frame 1. Oil is scooped up by the rotation of the shaft and is carried through the opening 22 to the top of the cage 5 from which it is fed by gravity to the several bearing surfaces and thence to the oil chamber 24.

The operation of the device is as follows: A suitable amount of clay or other plastic material 16 is placed in the mold 14 and the kneading member 17 is placed thereon, as illustrated in Fig. 1. The material 16 may be preformed to any desired shape and in a semi-finished state before it is subjected to this process.

The armature 2 of the motor is energized to rotate the cage 5 at a relatively high rate of speed, thereby setting up a rotating unbalanced radial or centrifugal force between the ball 8 and the race 9. This radial force causes the work table 10 to vibrate with a circular motion and also to revolve slightly or creep with respect to the frame 1. The inertia of the plastic material and of the kneading member 17 both resist the vibrating motion with forces which act upon the material to set up pressures and a state of flux within it. A clearance space 25 is formed between the plastic body and the kneading member 17 as a result of the horizontal kneading and vibrating action.

The kneading operation produces homogeneity in the structure of the clay body and obviates creases, fissures, folds and the like, previously introduced in the substance by the several working operations to which it may have been subjected. The degree and character of vibration may be varied by placing tapered rings 12^A on the flange 12 of the table 10 to change the amplitude and to unbalance the table 10, thereby causing a rolling motion or oscillation about a horizontal axis. It may also be altered by varying the number of balls 8 in the cage 5 by disposing two or more of such balls on one side of the cage or by varying the speed of the armature 2. The kneader 17 will have a planetary motion relative to the clay body and the mass of the kneader and the amplitude and frequency of vibration must be such as to produce sufficient pressure to knead the clay. The handle 18 is not utilized for manipulation during the kneading process but only facilitates the handling of the kneader while charging and discharging the mold.

It is evident from the above description of my invention that the process of kneading plastic bodies such as insulators with the device herein described provides an efficient and simple means for producing insulators or earthenware products of uniform quality having a homogenous structure throughout.

Although I have described a specific embodiment of my invention, it will be obvious to those skilled in the art that modifications may be made in the details of construction without departing from the principles herein set forth. For instance, the several details of my device may be altered to adapt the same for specific service conditions or any suitable mold and any type of kneader may be utilized in connection therewith for the purpose of manufacturing insulators, earthenware and other shapes from clay or other plastic bodies.

I claim as my invention:—

1. A device for working plastic bodies which comprises a base, a work table rotatably mounted thereon, means for rotating said table and centrifugal means for simultaneously vibrating the same.

2. A device for working plastic bodies which comprises a base, a work table rotatably mounted thereon, a mold mounted on said table, means for actuating said table and centrifugal means for vibrating the same.

3. A device for working plastic bodies which comprises a motor, a ball cage secured to the motor shaft, a work table rotatably mounted on said motor, a mold secured to said table and a kneading member for said mold.

4. A device for working plastic bodies which comprises a motor frame having an armature vertically disposed therein and journaled by a plurality of anti-friction bearings, a ball cage having a recess secured on the armature shaft, a ball for said recess, a work table rotatably mounted on said motor frame, means on said table for mounting damping rings, a mold secured on said table, a kneading member for said mold and means for lubricating the bearings of said table, motor frame and armature shaft.

5. The method of forming plastic bodies, which comprises providing a mold, filling the same with plastic material, kneading said material and simultaneously subjecting it to vibration.

6. The method of forming plastic bodies, which comprises, providing a mold, filling the same with plastic material, suspending a forming mass in said material and simultaneously spinning and vibrating said mold to work said material against the inertia of said mass.

In testimony whereof, I have hereunto subscribed my name this first day of August, 1923.

GEORGE M. EATON.